United States Patent [19]

Okita

[11] Patent Number: 4,800,458
[45] Date of Patent: Jan. 24, 1989

[54] RECORDING SHEET BONDED TO A SUBSTRATE IN A MAGNETIC DISK

[75] Inventor: Tsutomu Okita, Kanagawa, Japan

[73] Assignee: Fuji Photo Film Co., Ltd., Kanagawa, Japan

[21] Appl. No.: 910,918

[22] Filed: Sep. 24, 1986

[30] Foreign Application Priority Data

Sep. 24, 1985 [JP] Japan .......................... 60-144173[U]
Sep. 24, 1985 [JP] Japan .......................... 60-144174[U]
Jan. 13, 1986 [JP] Japan .............................. 61-2021[U]

[51] Int. Cl.$^4$ .............................................. G11B 5/82
[52] U.S. Cl. ..................................................... 360/135
[58] Field of Search .................................... 428/63–65;
156/295, 290, 229; 369/280, 282–284, 287;
360/131, 133, 135

[56] References Cited

U.S. PATENT DOCUMENTS

| | | | |
|---|---|---|---|
| 4,504,842 | 3/1985 | Odawara | 369/284 X |
| 4,555,716 | 11/1985 | Odawara et al. | 428/65 X |
| 4,573,097 | 2/1986 | Pastor et al. | 360/135 |
| 4,609,964 | 9/1986 | Sobel | 360/135 |
| 4,623,570 | 11/1986 | Alexander et al. | 428/65 |
| 4,631,609 | 12/1986 | Erickson et al. | 360/135 |

Primary Examiner—John H. Wolff
Attorney, Agent, or Firm—Sughrue, Mion, Zinn, Macpeak & Seas

[57] ABSTRACT

A recording disk in which on each side of a substrate an inner and outer mounting ring extends above the surface of the substrate. A flexible recording sheet is adhesively bonded to the mounting rings to thereby form a gap between the substrate and the recording sheet. The bonding surfaces include many recesses to absorb extra adhesive. The recesses may be small holes, circumferential grooves or radial grooves, possibly with varying cross-sections.

4 Claims, 4 Drawing Sheets

RECORDING SHEET BONDED TO A SUBSTRATE IN A MAGNETIC DISK

BACKGROUND OF THE INVENTION

1. Field of the Invention

This invention relates to a magnetic disk for magnetically recording signals on its surface in a direction parallel with the surface or in a direction perpendicular to the surface.

2. Background Art

One example of magnetic disk of this type is a rigid magnetic disk. The substrate of the rigid magnetic disk is made of a rigid material. Usually, an aluminum plate (JIS A5086 for instance) is employed as the substrate of the rigid magnetic disk.

The rigid magnetic disk is generally manufactured as follows. The aluminum plate is machined on a lathe to form a disk. In order to minimize the space between the magnetic head and the disk to thereby allow high density recording, the surface of the disk is polished. A magnetic layer is then formed on the thus polished surface by vacuum deposition or spin coating. In this case, the surface of the disk should be as smooth as possible for a high density recording and reproducing operation. However, it has been difficult for the conventional aluminum disk to have a surface which is not more than 0.1 micrometer in central line average roughness Ra. Furthermore, it is considerably difficult to handle the aluminum disk on the manufacturing line as it is not flexible. For instance, in forming a magnetic layer, it is impossible to continuously coat it with magnetic material. In addition, as the high density recording operation is greatly affected by dust on the surface of the disk, adherence of dust onto the disk must be prevented during the manufacture. Thus, the manufacture of rigid magnetic disks is intricate and considerably difficult and requires a great investment in equipment.

The conventional substrate is rigid since it is made, for instance, of aluminum as was described before. On the other hand, the magnetic head should trace the magnetic layer of the disk with a narrow space therebetween. It is rather difficult to maintain the narrow space unchanged, and therefore signal errors often take place. It is essential to reduce the space between the magnetic head and the disk surface. However, it is considerably difficult to do so. As the space is narrow as was described above, the magnetic head may contact the disk surface. If this malfunction occurs, since the substrate is rigid, a great impact is applied collectively to the part of the magnetic layer which the magnetic head has contacted. As a result, the magnetic layer may be broken. That is, the service life of the disk may be reduced.

Furthermore, the aluminum substrate polished as described above is expensive.

Recently, a magnetic disk has been proposed in the art which is manufactured as follows. Annular wide recesses are formed in both sides of a disk substrate. Two floppy disks or flexible disks (hereinafter referred to as "flexible disk sheets"), each of which has a magnetic layer on its one side, are bonded to both sides of the disk substrate in such a manner that the magnetic layers are exposed to the outside and gaps are formed between the disk substrate and the flexible disk sheets.

The magnetic recording surfaces of the rigid magnetic disk thus manufactured, unlike those of the rigid magnetic disk, are flexible. Therefore, when the magnetic head accidentally touches the magnetic recording surface or when a high density recording operation is carried out with the magnetic head in contact with the magnetic recording surface, the magnetic layer is scarcely broken as opposed to the case of the rigid magnetic disk. Accordingly, the flexible disk technique can be utilized as it is, and a smooth durable magnetic layer can be employed. Thus, the magnetic disk of this type is being watched with keen interest.

The inventors have conducted intensive research on the magnetic disk described above and have found that it still suffers from serious difficulties. Namely, if, when the flexible disk sheets are bonded on the substrate with adhesive, the quantity of adhesive is too small, then the flexible disk sheets may come off the substrate. On the other hand, if the quantity of adhesive is too large, the flexible disk sheets are liable to be creased or the adhesive is forced out of the magnetic disk.

SUMMARY OF THE INVENTION

Accordingly, an object of this invention is to eliminate the above-described difficulties.

More specifically, an object of the invention is to provide a magnetic disk which is so improved that the flexible disk sheets can be readily and positively bonded on the substrate.

The foregoing objects of the invention have been achieved by the provision of a magnetic disk having flexible disk sheets bonded on both sides of a substrate with gaps between the flexible sheets and the substrate. According to this invention, the sheet bonding surfaces of the substrate have a plurality of either small holes, circumferential grooves or radial grooves. The holes are substantially uniformly dispersed in each sheet bonding surface.

DETAILED DESCRIPTION OF THE PREFERRED EMBODIMENTS

Several embodiment of the invention will be described with reference to the accompanying drawings.

Figure 1:
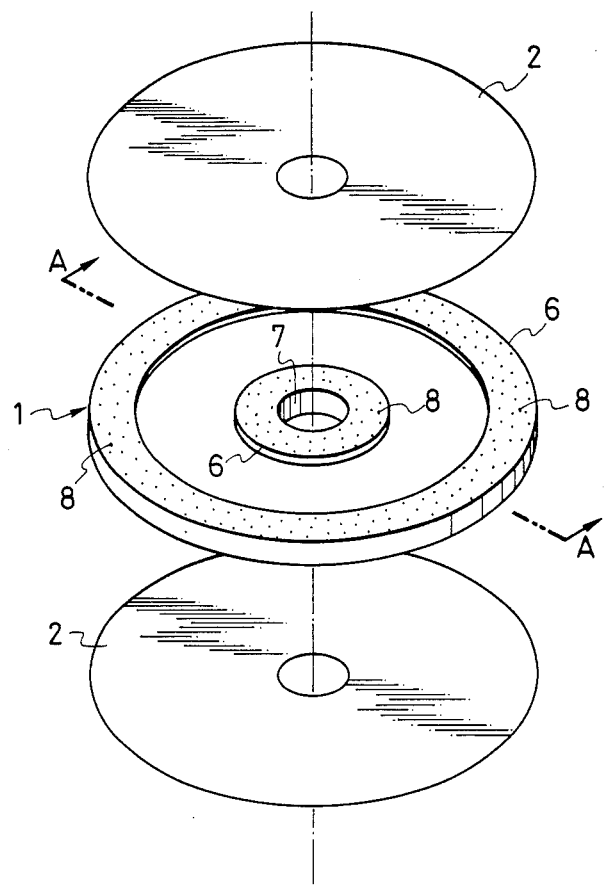
FIG. 1 is an exploded perspective view of one embodiment of the invention.

As shown in FIG. 1, a magnetic disk 1 according to the invention is formed by bonding flexible disk sheets 2 on both sides of a substrate 1. The substrate 1 has a central hole 7 at the center into which a rotary shaft or spindle for rotating the disk is inserted. The substrate 1 further comprises a ring-shaped inner peripheral part 6 around the central hole 7, and a ring-shaped outer peripheral part 6. These peripheral parts will hereafter be referred to as mounting rings 6. In the substrate 1, the inner and outer mounting rings 6 are larger in thickness than the remaining part. Each of the sheet bonding surfaces of the inner and outer mounting rings 6 has a number of small holes 8 which are substantially uniformly dispersed. The small holes 8 are not particularly limited in size and distance. However, the diameter may be about 1 mm and the distance between the holes may be 5 to 10 mm. In addition, the depth of the small holes 8 is also not particularly limited.

The inside and outside diameters of the substrate 1 and the dimensions of the inner and outer mounting rings 6 may be freely determined according to the purpose of use the magnetic disk.

It is essential that the material of the substrate 1 is not such that the substrate 1 is deformed during heat treatment. Accordingly, examples of the material of the substrate 1 are metals such as aluminum or an aluminum alloy, glass, and polymers which cause no thermal deformation in heat treatment. Combinations of these materials are also possible.

Figure 2:
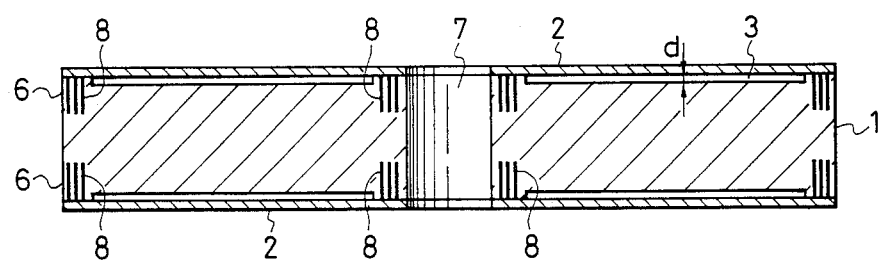
FIG. 2 is an enlarged sectional view taken along line A—A in FIG. 1.

It is also essential that the material of the substrate 1 is not expensive. For instance even if the substrate 1 is made of aluminum which is a typical metal, the magnetic layers are not affected by the surface roughness of the substrate 1 because gaps 3 are formed between the substrate 1 and the disk sheets 2 in the area of the recording regions of the magnetic disk sheets 4, as shown in FIG. 2. Accordingly, in this case, it is unnecessary to accurately polish the substrate 1. That is, the polishing of the substrate 1 can be achieved at relatively low cost.

A polymeric substrate is generally inexpensive because it can be mass-produced by injection molding.

The flexible disk sheets 2 of the magnetic disk according to the invention can be made of the material which is employed for manufacturing so-called "floppy disks". The support on which the magnetic layer of the flexible disk sheet 2 is formed may be made of plastic film such as polyethylene terephthalate film, or it may be made of biaxial orientation polyethyelene terephthalate (PET) film.

It is preferable that the side of the support of the flexible disk sheet 2 on which the magnetic layer is formed is not more than 0.1 micrometer in central roughness (Ra). A magnetic disk produced by using the support of this type affords increased recording density.

If, in the flexible disk sheet 2, both sides of the support are made smooth, then the friction is increased, and the supports tend to stick to each other, so that it is rather troublesome to handle them on the manufacturing line. In addition, the support thus treated is expensive. If, on the other hand, a magnetic disk is formed by using supports which have rough surfaces, then the space between the magnetic layer on the support and the magnetic head is increased. Therefore, the magnetic disk thus formed is not suitable for high density recording. Accordingly, it is preferable to form the magnetic layer on the smooth surface of a support whose other surface is rough.

The magnetic layer may be formed on the support by coating it with magnetic iron oxide or ferromagnetic alloy powder and binder, or it may be formed by vacuum deposition, sputtering or ion plating. That is, it may be formed by a vapor deposition method or a plating method.

The gaps 3 are formed for two purposes. First, when the magnetic head contacts the magnetic layer on the flexible disk sheet 2, the frictional force is dispersed to increase the durability. Secondly, the magnetic head can be suitably brought into contact with the magnetic layer and the space between the magnetic layer and the magnetic head is made extremely small, thus permitting high density recording operation. Accordingly, in view of the conditions of use of the magnetic disk, it is desirable that the depth d of the gaps 3 is at least 0.15 mm.

In the magnetic disk according to the invention, the thickness of the substrate 1 is generally 1 to 5 mm, and the thickness of the flexible disk sheets 2 bonded on the substrate 1 to 10 to 100 micrometers. Since the dimensional stability of the magnetic disk depends on that of the substrate 1, it is preferable to employ a substrate which shows a high dimensional stability.

The flexible disk sheets 2 are bonded on the substrate 1 as follows. A relatively large quantity of adhesive is applied to the inner and outer mounting rings 6 for each of the flexible disk sheets 2. The flexible disk sheet 2 is held tight to and bonded with the inner and outer mounting rings 6 of the substrate 1. In this operation the excessive amount of adhesive goes into the small holes 8. Accordingly, the flexible disk sheets 2 are bonded very closely on the sheet bonding surfaces of the substrate 1.

Examples of the adhesive are (1) a mixture of acrylic rosin resin or terpene resin and methacrylic acid, butyl acrylate or triethylene glycol diacrylate; (2) a urethane elastomer having an acryloyl group or methyacryloyl group; (3) a rubber resin such as polybutadiene or acrylonitrile-butadiene copolymer, polyester resin, or compounds formed by adding tackifier such as petroleus resin to these materials; and (4) a thermosetting adhesive, hot-melt adhesive, and radiation setting adhesive such as electron-beam setting adhesive or ultraviolet-ray setting adhesive. In order to facilitate the bonding of the flexible disk sheets on the substrate, it is desirable to apply a polymer such as polyester or polycarbonate to at last one of the surface which are bonded together, or to subject is to physical surface treatment such as corona discharge, glow discharge or flame treatment.

In the above-described embodiment, the small holes 8 have a predetermined depth. However, they may be so formed that they penetrate through the substrate 1. In addition, in the above-described embodiment, the small holes 8 are uniformly dispersed in the sheet bonding surfaces. However, the invention is not limited thereto or thereby. For instance, the small holes 8 may be formed in such a manner that they are greater in number towards the inner and outer peripheries of each sheet bonding surface. In this case, the adhesive can be more effectively prevented from being forced out of the magnetic disk.

Figure 3:
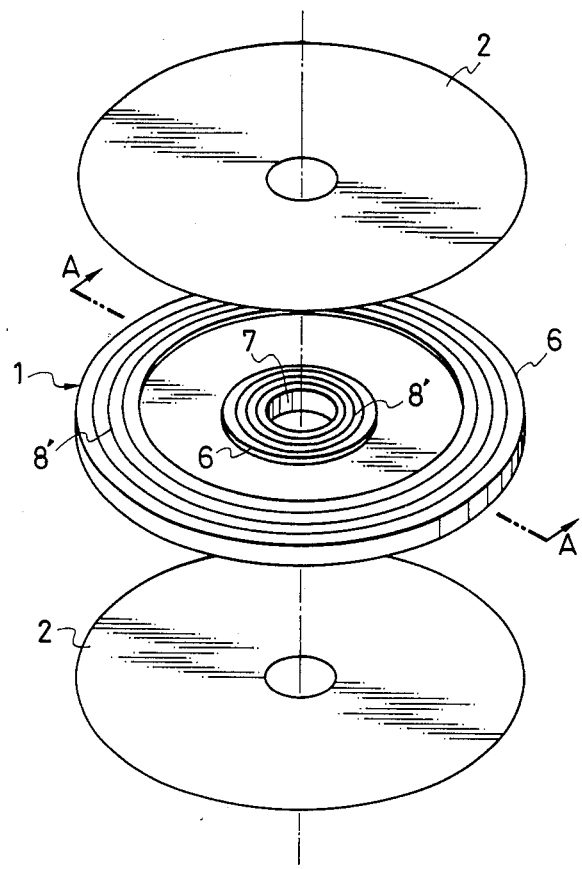
FIG. 3 is an exploded perspective view of a second embodiment of the invention.
Figure 4:
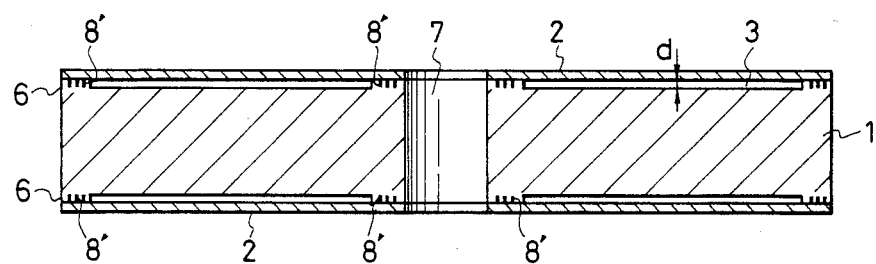
FIG. 4 is an enlarged sectional view taken along line A—A in FIG. 3.

FIGS. 3 and 4 show another embodiment of the present invention in which a plurality of grooves 8' are formed in the substrate 1 and extend in a circumferential direction of the substrate 1. In FIGS. 3 and 4, the plurality of grooves 8' extending in the circumferential direction are formed in the sheet bonding surfaces of both the inner and outer mounting rings 6. The other features are the same as those of the preceding embodiment. The function of the circumferential grooves 8' is the same as the discrete holes 8 of the embodiment of FIG. 1.

Figure 5:
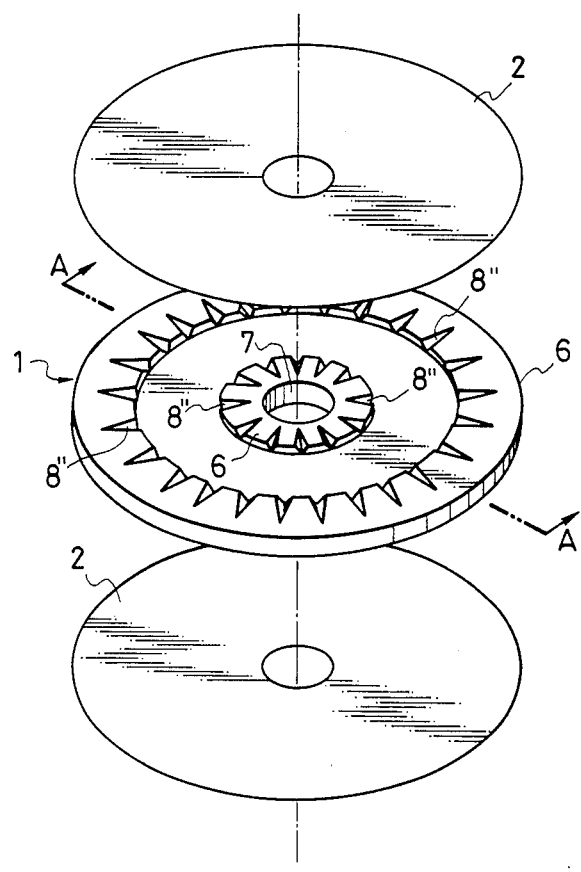
FIG. 5 is an exploded perspective view of a third embodiment of the invention.
Figure 6:
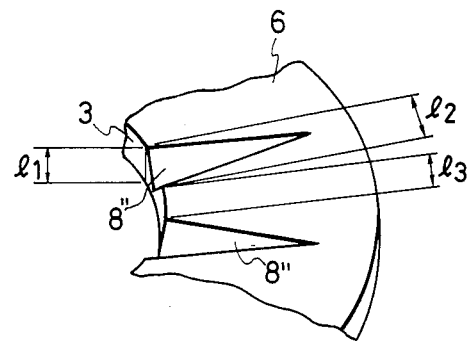
FIG. 6 is an exploded sectional view of a portion of FIG. 3.
Figure 7:
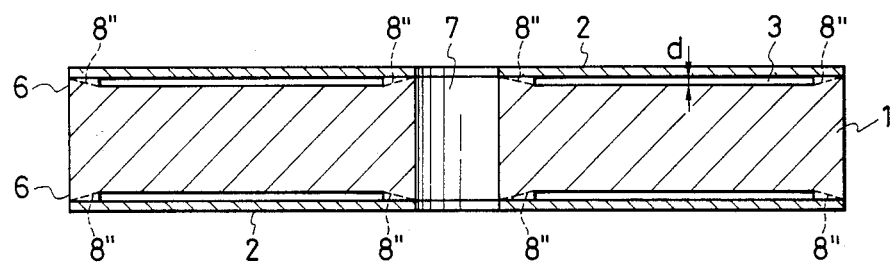
FIG. 7 is an enlarged sectional view taken along line A—A in FIG. 5.

FIGS. 5 to 7 show still another embodiment of the invention, in which a plurality of radial grooves 8" are formed in the sheet bonding surfaces of both the inner and outer mounting rings 6 of the substrate 1. A plurality of radial grooves 8" are formed in the surfaces of the peripheral mounting rings 6 on both sides of the substrate 1. That is, the radial grooves 8" are formed in the sheet bonding surfaces to which are bonded the flexible disk sheets 2. Each of the radial grooves 8" formed in the outer mounting ring 6 is enlarged in depth toward the center of the substrate 1, whereas each of the radial grooves 8″ formed in the inner mounting ring 6 is enlarged in depth radially outwardly. The radial grooves are V-shaped with their width increasing with the increase of depth. The radial grooves 8″ need not extend radially through the mounting rings 6. Also, as shown in FIG. 6, the depth $l_1$, the maximum width $l_2$ and the groove interval $l_3$ are not particularly limited but it is preferable that the depth $l_1$ falls within a range of 0.1 to 1.0 mm, the width $l_2$ falls within a range of 0.5 to 3.0 mm, and the interval $l_3$ falls within a range of 1.0 to 3.0 mm.

As was described above, the small discrete holes 8, the circumferential grooves 8′ or the radial grooves 8″ are formed in the sheet bonding surfaces of the substrate 1. Therefore, the excessive quantity of adhesive goes into the holes or grooves, so that the flexible disk sheets are satisfactorily bonded on the sheet bonding surfaces of the substrate, and the difficulty that the adhesive is forced out of the magnetic disk is eliminated. Thus, in the magnetic disk according to the invention, the flexible disk sheets are positively bonded on the sheet bonding surfaces of the substrate. The disk sheets are thus free from the difficulties that they become slackened or creased.

What is claimed is:

1. A recording disk, comprising:
a circular substrate having on each principal side a raised inner annular mounting ring and a raised outer annular mounting ring, said mounting rings together defining a first recess formed on respective sides of said substrate;
two flexible sheets having a recording layer formed on one side thereof and adhesively bonded on another side thereof to bonding surfaces of said inner and outer mounting rings to thereby form respective gaps between respective ones of said flexible sheets and respective bottom surfaces of said first recesses;
each of said bonding surfaces of each of said mounting rings being formed with a plurality of second recesses extending into said mounting rings from each said bonding surface for receiving excess adhesive, said second recesses comprising a plurality of grooves extending radially with respect to a center of said circular substrate for receiving said excess adhesive, each of said grooves being in fluid communication with said gap and having a depth which increases progressively toward said gap.

2. A recording disk, comprising;
a circular substrate having on at least one side at least two raised annular mounting rings together defining a first recess formed in said substrate;
a flexible recording sheet adhesive bonded to a bonding surface of each of said mounting rings, to form a gap between said flexible sheet and a bottom surface of said first recess;
said bonding surface of each of said mounting rings being formed with a plurality of second recesses extending into said mounting ring from said bonding surface for receiving excess adhesive, said second recesses comprising discrete holes having a small size as compared to a radius of said circular substrate for receiving said excess adhesive, said discrete holes being distributed over each of said bonding surfaces, wherein said discrete holes are distributed in such a manner that said discrete holes increase in number toward inner and outer peripheries of each said bonding surface.

3. A recording disk, comprising:
a circular substrate having on each principal side a raised inner annular mounting ring and a raised outer annular mounting ring, said mounting rings together defining a first recess formed on respective sides of said substrate;
two flexible sheets having a recording layer formed on one side thereof and adhesively bonded on another side thereof to bonding surfaces of said inner and outer mounting rings to thereby form respective gaps between respective ones of said flexible sheets and respective bottom surfaces of said first recesses;
each of said bonding surfaces of each of said mounting rings being formed with a plurality of second recesses extending into said mounting rings from each each bonding surface for receiving excess adhesive, said second recesses comprising a plurality of grooves extending radially with respect to a center of said circular substrate for receiving said excess adhesive, each of said grooves being in fluid communication with said gap and having a depth which increases progressively toward said gap, a width of said radially extending grooves as measured at the respective bonding surface increasing toward said gap.

4. A recording disk, comprising:
a circular substrate having on each principal side a raised inner annular mounting ring and a raised outer annular mounting ring, said mounting rings together defining a first recess formed on respective sides of said substrate;
two flexible sheets having a recording layer formed on one side thereof and adhesively bonded on another side thereof to bonding surfaces of said inner and outer mounting rings to thereby form respective gaps between respective ones of said flexible sheets and respective bottom surfaces of said first recesses;
each of said bonding surfaces of each of said mounting rings being formed with a plurality of second recesses extending into said mounting rings from each said bonding surface for receiving excess adhesive, said second recesses comprising a plurality of groove extending radially with respect to a center of said circular substrate, each of said grooves being in fluid communication with said gap and having a depth which increases progressively toward said gap;
said second recesses comprising a plurality of discrete holes of small size as compared to a radius of said circular substrate for receiving said excess adhesive, said discrete holes being distributed in each of said bonding surfaces such that the number of said discrete holes increases toward inner and outer peripheries of each of said bonding surfaces.

* * * * *